(12) United States Patent
Groubert et al.

(10) Patent No.: US 8,448,798 B2
(45) Date of Patent: May 28, 2013

(54) DISPENSING CLOSURE WITH PLIABLE SEALING SURFACE

(75) Inventors: Brian David Groubert, Boardman, OH (US); Barry Daggett, Austintown, OH (US)

(73) Assignee: Weatherchem Corporation, Twinsburg, OH (US)

( * ) Notice: Subject to any disclaimer, the term of this patent is extended or adjusted under 35 U.S.C. 154(b) by 129 days.

(21) Appl. No.: 12/898,441

(22) Filed: Oct. 5, 2010

(65) Prior Publication Data

US 2012/0080442 A1 Apr. 5, 2012

(51) Int. Cl.
*B65D 41/62* (2006.01)
*B65D 51/18* (2006.01)
*B28B 7/22* (2006.01)
*F16J 15/02* (2006.01)

(52) U.S. Cl.
USPC ......... 215/235; 220/254.3; 277/642; 264/255

(58) Field of Classification Search
USPC ................. 220/254.3, 254.1, 849, 810, 837, 220/836, 804, 806, 259.1, 256.1; 215/356, 215/355, 341, 344, 343, 346, 316, 237, 235, 215/243, 200; 264/242, 251; 222/544; 277/642, 277/641, 637, 628
IPC ..... B65D 39/04,41/62, 51/18; B28B 7/22; F16J 15/02
See application file for complete search history.

(56) References Cited

U.S. PATENT DOCUMENTS

| | | | | |
|---|---|---|---|---|
| 1,629,346 A * | 5/1927 | Larson | ......................... | 215/233 |
| 3,059,816 A * | 10/1962 | Goldstein | ..................... | 222/109 |
| 3,227,332 A * | 1/1966 | Gowdy et al. | ................. | 222/525 |
| 4,377,247 A * | 3/1983 | Hazard et al. | ................. | 222/517 |
| 4,516,689 A * | 5/1985 | Barker | ......................... | 222/556 |
| 4,545,495 A * | 10/1985 | Kinsley | ......................... | 215/235 |
| 5,437,383 A * | 8/1995 | Stull | ............................ | 215/235 |
| 5,769,253 A * | 6/1998 | Gross | .......................... | 215/237 |
| 5,992,668 A * | 11/1999 | Elliott | .......................... | 220/278 |
| 6,257,431 B1 * | 7/2001 | Baudin | ......................... | 215/237 |
| 6,382,476 B1 * | 5/2002 | Randall et al. | ............... | 222/545 |
| 6,942,224 B2 * | 9/2005 | Ludwig et al. | ................ | 277/637 |
| D628,891 S * | 12/2010 | Groubert et al. | .............. | D9/449 |
| D628,893 S * | 12/2010 | Groubert et al. | .............. | D9/449 |
| 2006/0016776 A1 * | 1/2006 | Barre et al. | ..................... | 215/237 |
| 2009/0236373 A1 * | 9/2009 | Laib et al. | ..................... | 222/484 |
| 2010/0264144 A1 * | 10/2010 | Nusbaum et al. | .......... | 220/258.2 |

* cited by examiner

*Primary Examiner* — Jacob K Ackun
*Assistant Examiner* — Robert J Hicks
(74) *Attorney, Agent, or Firm* — Turocy & Watson, LLP

(57) ABSTRACT

A dispensing closure that comprises a pliable sealing surface that is selectively formed with a dispensing opening or a cleanout. At least a portion of the pliable sealing surface can be formed at a base of a skirt, wherein the skirt engages the dispensing closure with the container. Material of the pliable sealing surface can be bonded with material of a body portion and a flap portion of the dispensing closure during a multi-shot injection molding process. The pliable sealing surface can be formed from a thermoplastic elastomer and the body portion and flap portion can be formed from a polymer material.

20 Claims, 4 Drawing Sheets

DISPENSING CLOSURE WITH PLIABLE SEALING SURFACE

TECHNICAL FIELD

The following description relates generally to dispensing closures for bottles, jars, and the like, and, more particularly to seals for dispensing closures.

BACKGROUND

Dispensing closures or caps are utilized with containers (e.g., bottles, jars, cans, and so forth) that can be made of the same, or a similar material, as the dispensing closure. For example, both the dispensing closure and the container can be formed from a polymer material. Further, the dispensing closure can include components, such as a flap that can be flipped away from a main portion of the dispensing closure in order to access contents of the container. The flipping or pivot action can provide access to the container contents without completely removing the dispensing closure from the container (e.g., allowing access to the container contents with minimal effort). The flap portion of the dispensing closure can include a cleanout that is inserted into a dispensing opening in the main portion. Both the cleanout and the dispensing opening can be made of the same, or a similar material, such as a polymer material.

Since the dispensing closure components and the container are generally formed of the same (or a similar) material, friction can be created when these items come in contact. For example, when a dispensing closure (or cap) is engaged with a container (e.g., cap is screwed onto the container), friction can be created. This friction can prevent the dispensing closure from completely sealing onto the container, which can produce areas of leakage. Further, if there are imperfections in the screw threads (or other contact portions of either (or both) the dispensing closure or container, the rigid material of the components can create gaps or other leakage areas due to the imperfections.

In a similar manner, contact between the dispensing closure components (e.g., cleanout and dispensing opening) can be a plastic-to-plastic contact. When the flap is to be opened, the friction created when the plastic flap is pulled away from the plastic dispensing closure can make it difficult to open the flap, especially for persons with arthritis or other disabilities. When the flap is to be closed, the rigid plastic-to-plastic contact can make it difficult to press down the flap to engage the cleanout completely into the dispensing opening. Thus, the seal might not be as tight as desired, especially for liquids and/or fine grain contents (e.g., powder, spices, and so forth), which can result in undesired leakage.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An aspect relates to a dispensing closure comprising a body portion, a flap portion, and a pliable sealing surface. The body portion comprises an end wall, an orifice in the end wall, and a skirt that depends from the end wall. Contents of a container are accessed through the orifice and the skirt engages the dispensing closure with the container. The flap portion comprises a depending wall that comprises a cleanout. The pliable sealing surface contacts a rim of the orifice and a perimeter of the cleanout when the flap portion is in a first position. In accordance with some aspects, the body portion and the flap portion are connected with a hinge, wherein the flap portion contacts the body portion in the first position and does not contact the body portion in a second position.

Another aspect relates to a method of producing a dispensing closure. The method comprises forming a body portion and a flap portion. The body portion comprises a skirt that engages the dispensing closure with a container and an orifice through which contents of the container are dispensed and the flap portion comprises a cleanout. The method also comprises forming a pliable sealing surface with the body portion and the flap portion. The pliable sealing surface is formed to contact a rim of the orifice and a perimeter of the cleanout when the flap portion is in a first position. According to some aspects, the body portion and the flap portion are formed of a polymer material and the pliable sealing surface is formed of a thermoplastic elastomer, the polymer material and the thermoplastic elastomer bond during a multi-shot molding process.

To the accomplishment of the foregoing and related ends, one or more aspects comprise features hereinafter fully described and particularly pointed out in the claims. The following description and annexed drawings set forth in detail certain illustrative features of one or more aspects. These features are indicative, however, of but a few of various ways in which principles of various aspects may be employed. Other advantages and novel features will become apparent from the following detailed description when considered in conjunction with the drawings and the disclosed aspects are intended to include all such aspects and their equivalents.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing these aspects.

Figure 1:
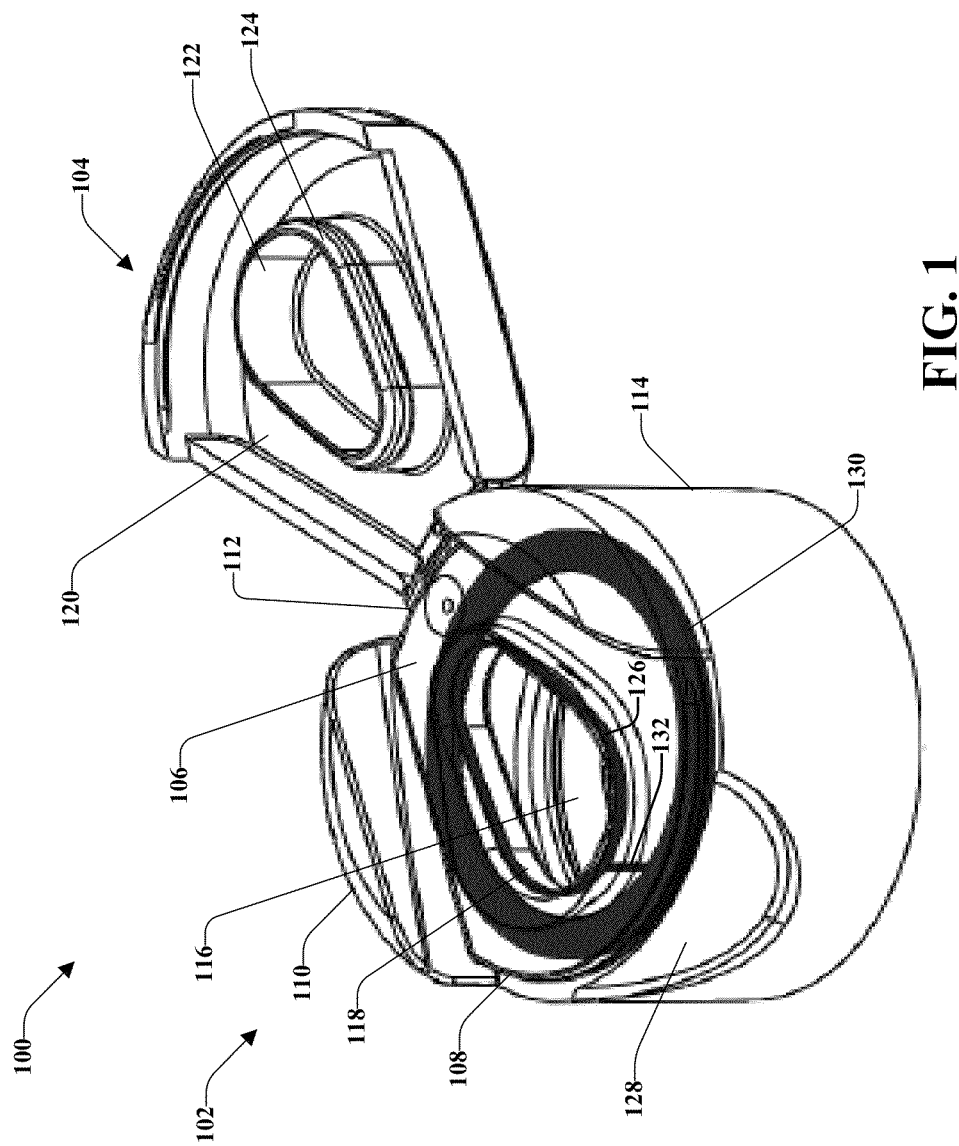
FIG. 1 illustrates a dispensing closure comprising a pliable sealing surface, according to an aspect.

Now turning to the figures, FIG. 1 illustrates a dispensing closure 100 comprising a pliable sealing surface, according to an aspect. The pliable sealing surface is configured to seal a dispensing opening and can allow the dispensing closure 100 to be opened for dispensing purposes and closed after dispensing while mitigating friction forces developed during the opening and closing functions. The pliable sealing surface can also provide a tight seal around the dispensing opening, which can provide fluid-tightness, according to an aspect. In accordance with some aspects, a pliable sealing surface can be applied between the dispensing closure and a landing of the container (e.g., located at a base of a skirt) to provide further sealing features.

Dispensing openings that are closed by plugging (e.g., such as flipping down a top that comprises a piece or plug that engages an orifice in a portion of the dispensing closure that covers a mouth of a container) might not close properly. For example, when the plug is pressed into the orifice, the mating surfaces of the plug and orifice, when made of similar material, might produce friction. The friction can be such that the mating surfaces do not engage fully, which can result in portions of the plug not fully engaging into the orifice. This can cause leakage of the container contents, which can develop if the container is dropped, placed on its side, inverted, and/or stored in an inverted position (e.g., with the dispensing closure forming the base of the container). Thus, if the orifice is not properly sealed by the plug, the contents of the container can leak, which can be especially pronounced when the contents are fluid or comprise smaller particles. Further, since the orifice and plug might be non-round (the design can be a function of the contents or based on other considerations), the pressure on the plug (to engage the plug into the orifice) might be non-uniform. This non-uniform pressure can cause only some portions of the plug to be fully engaged in the orifice, leading to leakage concerns. In accordance with some aspects, the orifice can be a round orifice.

In accordance with some aspects, the dispensing closure 100 is formed of an injection molded suitable thermoplastic material (e.g., polymer) or other material well known in the art. In accordance with some aspects, the dispensing closure 100 can be formed by a multi-shot injection molding process (e.g., two-shot, three-shot, and so forth). Generally, each "shot" is an injection molding process. For example, the dispensing closure might consist of different colors, wherein a different shot is used for each color. Additionally or alternatively, the dispensing closure can be made of different materials, wherein a different shot is utilized for each material.

The dispensing closure 100 can be a unitary or a one-piece structure. In accordance with some aspects, the dispensing closure is a two-piece structure. It should be noted that although the various aspects are illustrated as a generally circular dispensing closure, the various aspects are not limited to this implementation. In accordance with some aspects, the dispensing closure can have a different geometric shape (e.g., oval, oblong, and so on).

Ordinarily, a dispensing closure is installed upright on the top of a container (FIG. 2) that has a mouth that typically lies in a horizontal plane. For purposes of discussion, the vertical direction generally corresponds to an axial direction with reference to the geometry of the dispensing closure 100 and the horizontal direction or horizontal plane is perpendicular to the axial direction of the dispending closure 100 (e.g., the vertical direction). It should be understood that during molding, the dispensing closure could have a non-upright orientation.

Figure 2:
FIG. 2 illustrates a cross section side view of a dispensing closure that comprises a pliable sealing surface, according to an aspect.

Dispensing closure 100 comprises a body portion 102 and a flap portion 104. The flap portion 104 can have at least two positions: a first position and a second position. When the flap portion 104 contacts the body portion 102 (e.g., the dispensing closure is closed), the flap portion 104 is in the first position. When the flap portion 104 is away from the body portion 102 (e.g., the container contents can be dispensed), the flap portion 104 is in the second position. FIG. 1 illustrates the dispensing closure in the second position. FIG. 2 illustrates a dispensing closure in the first position.

The body portion 102 comprises an end wall 106, which, in the illustrated example, comprises an inclined central deck area 108 and lateral transition area 110. The flap portion 104 is pivotally joined to the end wall 106 by, for example, a hinge 112. The hinge can be a "living hinge" that is formed with body portion and the flap portion as a single piece. In accordance with some aspects, the hinge can be a "pivoting hinge" that is formed with the body portion (or the flap portion), wherein the body portion and the flap portion are formed as separate pieces and snapped together at the hinge to combine the two pieces.

The hinge 112 lies in a plane perpendicular to the axis of a skirt 114. The hinge 112 allows for ease of moving the flap portion 104 between the first position and the second position. The hinge 112 can be constructed of a relatively thin wall that is configured to flex without breakage during an expected service life of the dispensing closure 100. The hinge 112 allows the flap portion 104 to be moved away from the body portion 102 (e.g., flipped up, placed into second position) for dispensing and is moved into contact with the body portion 102 (e.g., placed into first position) for storage purposes. In accordance with some aspects, the body portion 102 and the flap portion 104 can be separate pieces (e.g., a hinge is not utilized).

A hollow skirt 114 depends from the end wall 106. The skirt 114 is configured to engage with a container (e.g., bottle, jar, and so forth). For example, the skirt 114 can engage with a mouth of a container (shown in FIG. 2) in a threaded manner or in a non-threaded manner. In accordance with some aspects, an interior portion of the skirt 114 can comprise screw threads that are configured to engage complimentary threads on a neck portion of the container, wherein the dispensing closure 100 can be screwed onto the mouth of the container. According to some aspects, internal threads are not utilized and the dispensing closure 100 is engaged with the container through other means (e.g., snap-on, press-on, and so forth). Further, the dispensing closure 100 can engage the container in a removable manner or in a non-removable manner. An exterior portion of the skirt 114 can be smooth or can comprise small vertical grooves or other textural features that can improve a person's ability to grip the dispensing closure 100 for removal from the container (e.g., by unscrewing, by pulling the dispensing closure 100 away from the container, and so on).

The body portion 102 also comprises a dispensing opening or orifice 116 though which contents of the container are dispensed. An example of a tear-drop shaped orifice is illustrated, wherein a narrow end of the orifice 116 is proximal to the hinge 112 and a major end of the orifice 116 is distal from the hinge 112. However, the orifice 116 can be any geometric shape including both round and non-round shapes (e.g., pear-shaped, oval-shaped, and so on). The orifice 116 comprises a rim 118 and can be level with the inclined central deck 108 of the body portion 102, as illustrated. However, in accordance with some aspects, the orifice 116 can include an inclined spout or another configuration that facilitates dispensing of the container contents.

Located on an underside of the flap portion 104 is a depending wall 120 having a configuration that is complimentary to the orifice 116. In accordance with some aspects, the depending wall 120 has a curvilinear configuration. The depending wall 120 comprises a plug or cleanout 122 that is configured to close the dispensing closure 100 in a sealed manner (e.g., fluid-tight manner). The cleanout 122 comprises a perimeter 124 and can be the same (or a similar) shape as the orifice 116. In accordance with some aspects, the cleanout 122 is slightly smaller than the orifice 116, which allows the cleanout 122 to fit inside the orifice 116 when the flap portion 104 is in contact with the body portion 102. In more detail, when the flap portion 104 is closed against or adjacent the end wall 106, the cleanout 122 enters the orifice 116 and the perimeter 124 of the cleanout 122 is engaged by sealing beads or a pliable sealing surface with a fluid-tight engagement.

When a person pushes down on the flap portion 104 to engage the cleanout 122 into the orifice 116 (e.g., to contact the perimeter 124 with the rim 118), different pressures can develop around the cleanout 122. For example, if the orifice 116 and cleanout 122 are large (in surface area) or have a geometry that is not uniform or non-round (e.g., tear-drop-shaped), pressure applied to one portion of the cleanout can be greater than pressure applied to another portion of the cleanout. Further, there might be different pressures applied since the user might simply be pushing down at any portion of the flap portion 104, which might not be over the cleanout 122, especially if the cleanout 122 and orifice 116 are small. For example, the size of a dispensing opening for vanilla extract might have a small circumference so that a small quantity of fluid is removed from the container at a time. However, the container might be large (depending on the quantity of vanilla extract purchased). Thus, the size of the dispensing opening is small compared to the size of the dispensing closure.

To overcome problems associated with uneven sealing of the cleanout 122 into the orifice 116, a pliable sealing surface 126 can be formed around the rim 118 of the orifice 116. In accordance with some aspects, the pliable sealing surface is formed at the perimeter 124 of the cleanout 122. The pliable sealing surface 126 can be formed though a multi-shot injection molding process. For example, the body portion 102 and the flap portion 104 are formed during a first-shot injection molding process and the pliable sealing surface 126 is formed during a second-shot injection molding process. The material of the body portion 102 and the flap portion 104 bond with the material of the pliable sealing surface 126 during the molding process. In accordance with some aspects, the body portion 102 and the flap portion 104 are formed with a single-shot (or multi-shot) process (as a single piece or as a two-piece structure) and the pliable sealing surface 126 is formed with a second-shot (or subsequent-shot) process.

The pliable sealing surface 126 can be made from any pliable-type material suited for the intended purpose of the dispensing closure 100. Examples of pliable-type material include thermoplastic elastomers, silicone, and so forth. The material selected should be capable of being deformed (e.g., can be indented) or that has at least some flexibility. In accordance with some aspects, the pliable-type material can have a shore hardness that is a function of the application (e.g., material of the dispensing closure, application of the dispensing closure, desired ease of closing, contents of the container, and so forth). Shore hardness indicates the elasticity of the material. The higher the number, the greater the resistance. Some shore hardnesses can be hard and sticky to the touch while other shore hardnesses can be soft to the touch.

In accordance with some aspects, the material utilized for the pliable sealing surface 126 is selected as a function of the desired sealing ability of the dispensing closure 100. For example, a material with a low shore hardness (e.g., very pliable) can be utilized if the container contents are expected to be a liquid. A low-shore hardness can provide a sealing surface that can conform to irregularities of the rim 118 and/or perimeter 124. In another example, a material with a higher shore harness can be utilized if the container contents are solid or semi-solid (e.g., a fluid-tight seal is not needed). Examples, of solid or semi-solid contents include food items (e.g., spices, cookies, cereal, peanuts, grains, and so forth) and non-food items, such as hardware (e.g., nuts, bolts, nails, fasteners, screws) as well as other items (e.g., rock salt, grass seed, sand, medicines, cosmetics, and so on). The container contents that can be utilized with dispensing closure 100 are endless and, therefore, will not be further discussed herein.

The pliable-type material of the pliable sealing surface 126 can be located around the rim 118. In accordance with some aspects, the pliable sealing surface 126 can be located around the perimeter 124. The location of the pliable sealing surface 126 should be selected so that the pliable sealing surface 126 contacts both the cleanout 122 and the orifice 116 when the flap portion 104 is in a closed or first position. For example, the pliable sealing surface 126 is located between the rim 118 of the orifice 116 and the perimeter 124 of the cleanout 122 when the flap portion 104 is in the first position. Engagement of the pliable sealing surface 126 between the cleanout 122 and the orifice 116 can provide a secure seal that mitigates leakage of the container contents.

Regardless of the location of the pliable sealing surface (e.g., rim of the orifice, perimeter of the cleanout), the friction forces of pressing the cleanout into the orifice can be overcome by deforming the pliable sealing surface. For example, if the dispensing closure is made of plastic, a large amount of friction can be caused between the plastic cleanout and the plastic orifice, wherein there are portions that are not sealed properly. Forming the dispensing closure with a pliable sealing surface can overcome sealing problems because plastic is no longer in direct contact with plastic, for example. Instead, in accordance with an aspect, the pliable material is engaging plastic (or other material) of the orifice or cleanout, depending on where the pliable sealing surface is located. Since the pliable material has at least some flexibility, the pliable material can conform to the actual shape of the material (e.g., polymer) it contacts.

In accordance with some aspects, the skirt 114 can comprise a shallow recess 128 that allows a person to grip an edge of the flap portion 104. Moderate upward pressure can be applied to the underside of the flap portion 104 to overcome retention forces of the seal and friction between the cleanout 122 and the orifice 116. The retention forces can further be overcome with the use of a pliable sealing surface, as disclosed herein.

In accordance with some aspects, a portion of the pliable sealing surface 126 is formed at a lower face or base 130 of the end wall 106. The base 130 comprises a continuous sealing surface (e.g., pliable sealing surface) that contacts and can engage the mouth of a container (e.g., a landing of a container). Forming a portion of the pliable sealing surface 126 at the base 130 in such a manner can create a leak proof seal with the container. In order to create both the contact between the cleanout and orifice and the container, a connecting flow channel 132 is utilized to allow for a single-shot injection molding process for both pliable sealing surfaces (e.g., the sealing surface around the orifice (or the cleanout) and the portion that contact the container landing are formed during a single molding process). FIG. 2 illustrates a cross section side view of a dispensing closure 200 that comprises a pliable sealing surface, according to an aspect. As illustrated, dispensing closure 200 can engage with a container 202 at a landing point 204. In accordance with some aspects, the container 202 is an injection blow molded plastic bottle. The container 202 and dispensing closure 200 comprise a container assembly.

The dispensing closure 200 can be constructed of various materials known in the art, including, for example, polypropylene material or other polymer material. A pliable sealing surface 206 can be constructed of pliable material, such as a thermoplastic elastomer, silicone, and so forth. The material of the pliable sealing surface 206 and the material of the dispensing closure 200 can bond during a multi-shot molding process. For example, the dispensing closure 200 can be formed with a first-shot and the pliable sealing surface 206 can be formed with the second shot. However, it should be understood that any number of shots can be utilized and can be applied in any order (e.g., the pliable sealing surface can be formed during the first shot and the body and flap portion can be formed during the second shot). When in use, the pliable material conforms to the geometry of a clean out and landing on the bottle to create a leak proof seal. Including a pliable sealing surface at the landing of the container 202 (e.g., contact point between the dispensing closure 200 and the container 202) is advantageous because the container 202 and the dispensing closure 200 might be formed of the same (or a similar) material, which can produce friction forces when the dispensing closure 200 is engaged with the container 202 (e.g., screwed onto the container). Further, the pliable sealing surface can overcome (e.g., conform to) any deformities or defects that might result in gaps between the dispensing closure 200 and container 202 if a pliable sealing surface is not utilized. The gaps can be developed during the injection molding process (e.g., excessive shrinkage of plastic, deformities of the mold, and so forth).

Figure 3:
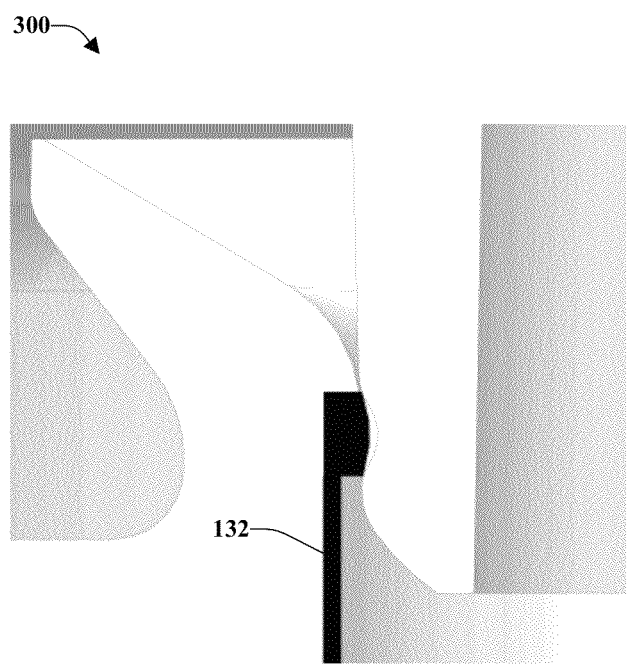
FIG. 3 illustrates a cut-away view of a portion of a dispensing closure, according to an aspect.

FIG. 3 illustrates a cut-away view of a portion of a dispensing closure 300 showing a portion of a clean out orifice seal bead, according to an aspect. A flow channel 132 is created to fill an orifice seal bead, according to an aspect.

In view of exemplary systems shown and described above, methods that may be implemented in accordance with the disclosed subject matter, will be better appreciated with reference to various flow charts. While, for purposes of simplicity of explanation, methods are shown and described as a series of blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methods described herein. It is to be appreciated that functionality associated with blocks may be implemented by software, hardware, a combination thereof or any other suitable means (e.g. device, system, process, component, controller, injection molding machinery, and so on). Additionally, it should be further appreciated that methods disclosed throughout this specification are capable of being stored on an article of manufacture to facilitate transporting and transferring such methods to various devices. Those skilled in the art will understand and appreciate that a method could alternatively be represented as a series of interrelated states or events, such as in a state diagram.

Figure 4:
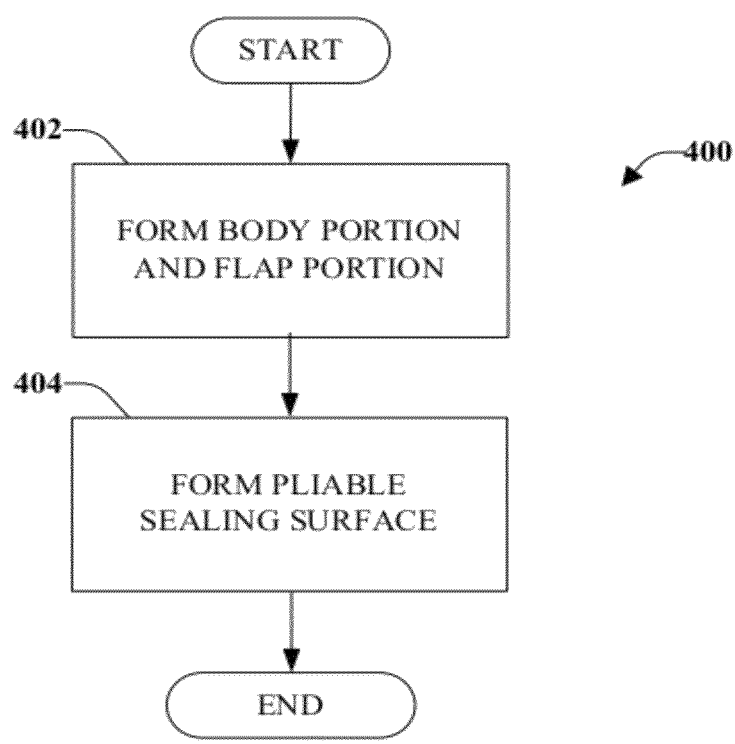
FIG. 4 illustrates a method for producing a dispensing closure, according to an aspect.

FIG. 4 illustrates a method 400 for producing a dispensing closure, according to an aspect. Method starts, at 402, when a body portion and a flap portion of the dispensing closure are formed. The body portion comprises a skirt that can engage the dispensing closure with a container and an orifice through which contents of the container are dispensed. The flap portion comprises a cleanout configured to engage the orifice when the flap portion is in a first position (e.g., closed). According to some aspects, forming the body portion comprises creating a non-round orifice. In accordance with some aspects, forming the body portion comprises creating a round orifice.

At 404, a pliable sealing surface is formed with the body portion and the flap portion. The pliable sealing surface is formed to contact a rim of the orifice and a perimeter of the cleanout when the flap portion is in the first position. According to some aspects, forming the pliable sealing surface comprises forming the pliable sealing surface on the rim of the orifice. According to some aspects, forming the pliable sealing surface comprises forming the pliable sealing surface on a perimeter of the cleanout.

In accordance with some aspects, forming the body portion and the flap portion and forming the pliable sealing surface comprise utilizing a multi-shot injection molding process. According to some aspects, forming the body portion comprises performing a first injection process and forming the pliable sealing surface comprises performing a second injection process. Alternatively or additionally, according to some aspects, forming the body portion comprises utilizing a polymer material and forming the pliable sealing surface comprises utilizing a thermoplastic elastomer. Additionally or alternatively, the pliable sealing surface is formed at a contact point with a container mouth (e.g., landing of the container).

While the foregoing disclosure discusses illustrative aspects and/or embodiments, it should be noted that various changes and modifications could be made herein without departing from the scope of described aspects and/or embodiments as defined by the appended claims. Accordingly, described aspects are intended to embrace all such alterations, modifications and variations that fall within scope of appended claims. Furthermore, although elements of described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Additionally, in the subject description, the word "exemplary" (and variants thereof) is used to mean serving as an example, instance, or illustration. Any aspect or design described herein as "exemplary" is not necessarily to be construed as preferred or advantageous over other aspects or designs. Rather, use of the word "exemplary" is intended to present concepts in a concrete manner.

What is claimed is:
1. A dispensing closure, comprising:
   a body portion comprising:
      an end wall;
      a non-round orifice in the end wall; and
      a skirt that depends from the end wall, the skirt engages the dispensing closure with a container;
   a flap portion comprising a depending wall that comprises a cleanout;
   a first portion of a pliable sealing surface located around a rim of the non-round orifice; and a second portion of the pliable sealing surface located at a base of the skirt, wherein a connecting flow channel connects the first portion of the pliable sealing surface and the second portion of the pliable sealing surface.

2. The dispensing closure of claim 1, wherein the first portion of the pliable sealing surface conforms to a geometry of the cleanout when the flap portion is in a first position.

3. The dispensing closure of claim 1, wherein the non-round orifice is a tear-drop shaped orifice.

4. The dispensing closure of claim 1, wherein the first portion of the pliable sealing surface and the second portion of the pliable sealing surface are formed from a thermoplastic elastomer.

5. The dispensing closure of claim 1, wherein the first portion of the pliable sealing surface and the second portion of the pliable sealing surface are formed from silicone.

6. The dispensing closure of claim 1, wherein the body portion and the flap portion are formed of a polymer material and the first portion of the pliable sealing surface and the second portion of the pliable sealing surface are formed of a thermoplastic elastomer, and wherein the polymer material and the thermoplastic elastomer bond during a multi-shot molding process.

7. The dispensing closure of claim 1, wherein the body portion and the flap portion are connected with a hinge, wherein the flap portion contacts the body portion in a first position and does not contact the body portion in a second position.

8. The dispensing closure of claim 7, wherein the hinge is a living hinge or a pivoting hinge.

9. The dispensing closure of claim 1, wherein the dispensing closure is formed in a multi-shot injection molding process.

10. The dispensing closure of claim 1, wherein the first portion of the pliable sealing surface and the second portion of the pliable sealing surface are formed with the connecting flow channel during a single molding process.

11. A container assembly, comprising:
a container; and
a closure operatively attached to the container, the closure comprises:
a body portion comprising:
an end wall;
a skirt that depends from the end wall and engages the closure with the container;
a non-round orifice in the end wall, wherein contents of the container are accessed through the non-round orifice; and
a flap portion comprising a depending wall that comprises a cleanout;
a first portion of a pliable sealing surface located at a rim of the non-round orifice; and
a connecting flow channel connecting the first portion of the pliable sealing surface to a second portion of the pliable sealing surface located at a base of the skirt.

12. The container assembly of claim 11, wherein the first portion of the pliable sealing surface conforms to a geometry of the cleanout when the flap portion is in a first position.

13. The container assembly of claim 11, wherein the non-round orifice is a tear-drop shaped orifice.

14. The container assembly of claim 11, wherein the first portion of the pliable sealing surface and the second portion of the pliable sealing surface are formed from a thermoplastic elastomer.

15. The container assembly of claim 11, wherein the first portion of the pliable sealing surface and the second portion of the pliable sealing surface are formed from silicone.

16. The container assembly of claim 11, wherein the body portion and the flap portion are formed of a polymer material and the first portion of the pliable sealing surface and the second portion of the pliable sealing surface are formed of a thermoplastic elastomer, the polymer material and the thermoplastic elastomer bond during a multi-shot molding process.

17. The container assembly of claim 11, wherein the body portion and the flap portion are connected with a hinge, wherein the flap portion contacts the body portion in a first position and does not contact the body portion in a second position.

18. The container assembly of claim 17, wherein the hinge is a living hinge or a pivoting hinge.

19. The container assembly of claim 11, wherein the first portion of the pliable sealing surface and the second portion of the pliable sealing surface are formed with the connecting flow channel during a single molding process.

20. The container assembly of claim 11, wherein the closure is formed in a multi-shot injection molding process.

* * * * *